United States Patent
Lam et al.

(10) Patent No.: US 10,174,227 B2
(45) Date of Patent: Jan. 8, 2019

(54) SEALANT COMPOSITION

(71) Applicant: Top Alliance Technology Limited, Tortola (VG)

(72) Inventors: Koon Fung Lam, Tuen Mun (HK); Wai Ming Chan, Tseung Kwan O (HK)

(73) Assignee: TOP ALLIANCE TECHNOLOGY LIMITED, Tortola (VG)

( * ) Notice: Subject to any disclaimer, the term of this patent is extended or adjusted under 35 U.S.C. 154(b) by 118 days.

(21) Appl. No.: 14/133,377

(22) Filed: Dec. 18, 2013

(65) Prior Publication Data

US 2015/0166848 A1 Jun. 18, 2015

(51) Int. Cl.
*C09J 121/02* (2006.01)
*B29C 73/16* (2006.01)
*C08K 7/26* (2006.01)
*C08K 5/053* (2006.01)
*C08K 7/24* (2006.01)

(52) U.S. Cl.
CPC .......... *C09J 121/02* (2013.01); *B29C 73/163* (2013.01); *C08K 5/053* (2013.01); *C08K 7/24* (2013.01); *C08K 7/26* (2013.01)

(58) Field of Classification Search
CPC ................................ C09J 121/02; B29C 73/16
See application file for complete search history.

(56) References Cited

U.S. PATENT DOCUMENTS

| | | | |
|---|---|---|---|
| 4,049,781 A * | 9/1977 | Acker et al. | 423/338 |
| 5,226,958 A * | 7/1993 | Bowman et al. | 106/33 |
| 6,454,892 B1 * | 9/2002 | Gerresheim | B29C 73/163 152/503 |
| 7,868,061 B2 * | 1/2011 | Cegelski et al. | 523/166 |
| 2002/0112777 A1 * | 8/2002 | Fang et al. | 141/38 |
| 2012/0118199 A1 * | 5/2012 | Lam | B29C 73/163 106/33 |
| 2014/0072879 A1 * | 3/2014 | Chen | H01M 4/60 429/300 |

FOREIGN PATENT DOCUMENTS

| | | | |
|---|---|---|---|
| CN | 102559139 A | 7/2012 | |
| CN | 103301109 A | 9/2013 | |
| EP | 2655504 | 5/1998 | |
| EP | 1291159 A1 * | 3/2003 | B29C 73/163 |
| JP | 201126533 A | 2/2011 | |
| JP | 2013249447 A | 12/2013 | |
| JP | 2014000694 A | 1/2014 | |
| WO | 2012/085869 A1 | 6/2012 | |

OTHER PUBLICATIONS

Machine translation of CN 103031109 A, retrieved Sep. 2017 (Year: 2017).*
European Search Report issued in corresponding EP application No. 13899633.5, dated Jul. 20, 2017, 6 pages.
Office Action issued in corresponding CA application No. 2,836,978, dated Jun. 5, 2017, 4 pages.
Office Action issued in corresponding TW application, 7 pages.
Office Action issued in corresponding Chinese application, 7 pages.
Examination Report issued in corresponding Australian application No. 2013273741, dated Aug. 14, 2017, 5 pages.

* cited by examiner

*Primary Examiner* — Nicole M. Buie-Hatcher
(74) *Attorney, Agent, or Firm* — Raymond R. Ferrera; Adams and Reese LLP

(57) ABSTRACT

A sealant composition is provided; the sealant composition comprises latex emulsion, nanoporous particles, surfactant, anti-freezing agent, wetting agent, and water. The sealant composition of the present application achieves a good sealing performance for the puncture of the tire. Furthermore, the sealant composition is easy to use and non-perishable, and has a long shelf life, which endows the sealant composition with a good market prospect.

9 Claims, No Drawings

SEALANT COMPOSITION

FIELD OF THE INVENTION

The present application relates to a sealant composition.

BACKGROUND OF THE INVENTION

A tire of a vehicle may be punctured by a hard object on the road, and the punctured tire may roll unsteadily. This situation may cause a traffic accident and do physical harm to the driver of the vehicle. In order to avoid this situation, a kind of liquid sealant is developed. As a temporary emergent method, the liquid sealant can be used for repairing the punctured tire, so that the vehicle can continue to travel until reaching a repairing station.

At present, the liquid sealant on the market can be made according to various formulations. Most current formulations of the liquid sealant contain natural latex. For example, the invention patent U.S. Pat. No. 6,344,499 B1 discloses a kind of sealant comprising 55-60 wt % deproteinized natural latex. Another invention patent U.S. Pat. No. 6,992,119 B2 discloses a kind of sealant comprising 30-60 wt % natural latex. For the sealing purpose, various kinds of tackifier such as aromatic terpene resin or phenol resin can be added to the sealant, as pointed out by the invention patent U.S. Pat. No. 6,864,305 B2. Additionally, the invention patent U.S. Pat. No. 8,148,448 B2 discloses that 20-40 wt % VEVA copolymer resin can be used as the tackifier. The invention patent US 20120277364 A1 discloses that other materials, such as synthetic latex, can also be used as the tackifier.

As the liquid sealant may be applied at a wide temperature range, most kinds of the liquid sealant comprises anti-freezing agent. The choice of the anti-freezing agent is critical for determining whether the liquid sealant has a lower viscosity or not. In the invention patent U.S. Pat. No. 6,344,499 B1 and the invention patent U.S. Pat. No. 6,864,305 B2, ethylene glycol or propylene glycol can be used as the anti-freezing agent. However, since ethylene glycol is toxic to the environment, ethylene glycol is not preferable. The patent U.S. Pat. No. 7,388,041 B2 and the patent U.S. Pat. No. 8,183,309 B2 disclose glycerin, 1,3-propanediol, and other anti-freezing agents respectively. To further reducing the viscosity, the patent U.S. Pat. No. 7,388,041 B2 discloses that potassium acetate can be added into glycerin so that using less quantity of glycerin can achieve the same anti-freezing effect as using a large quantity of pure glycerin.

Furthermore, to improve the sealing performance, solid components can also be added into the liquid sealant. For example, in the sealant formulation disclosed by the patent U.S. Pat. No. 7,868,061 B2, 2.5-10 wt % fiber material is added into the sealant, and the latex component is reduced to 1-10 wt %. In another invention patent U.S. Pat. No. 7,589,135 B2, a kind of sealant comprising synthetic short fibers and rubber latex is disclosed.

Except the sealing performance, the stability of the liquid sealant is also important, particularly in the liquid sealant comprising natural latex. Surfactant can be added into the liquid sealant to improve the stability of the liquid sealant. In general, anionic surfactant added into the liquid sealant can achieve a superior stabilizing effect, but it would result in a high viscosity of the liquid sealant, especially at a low temperature. Thus, the patent U.S. Pat. No. 8,242,196 B2 mentions that it is preferred to use nonionic surfactant. The invention patent U.S. Pat. No. 8,470,909 B2 discloses a combination comprising both anionic surfactant and non-ionic surfactant, which is configured for improving the stabilization of the liquid sealant.

Although a number of sealant products have been developed, most of them contain solid contents with large mass percentages (above 15 wt %). When these sealant products are used, they may cause environmental pollution problems or cleanliness problems. However, other sealant products may be unstable or have not a good tire sealing effect at a wide temperature range. Furthermore, the use of sealant comprising toxic components such as ethylene glycol is undesirable, and solid particles and fibers used in sealant may cause sedimentation problems.

SUMMARY OF THE INVENTION

The objective of the present application is to provide a sealant composition, aiming at the defect that the sealing performance and the stability of the sealant in the prior art are not good.

The technical solutions of the present application for solving the technical problems are as follows:

In one aspect, a sealant composition is provided, the sealant composition comprises latex emulsion, nanoporous particles, surfactant, anti-freezing agent, wetting agent, and water.

In one embodiment, the nanoporous particles include at least one of zeolite, silica aerogel, mesoporous silica, carbon aerogel, mesoporous carbon, activated carbon, cenosphere, diatomite, porous metal organic frameworks (MOFs).

In another embodiment, the weight percentage of the nanoporous particles in the sealant composition is ranged from 0.01% to 5%.

In another embodiment, the weight percentage of the anti-freezing agent in the sealant composition is ranged from 40% to 90%.

In another embodiment, the anti-freezing agent includes at least one of propylene glycol, glycerin, diethylene glycol, and 1,3-propanediol.

In another embodiment, the weight percentage of the latex emulsion in the sealant composition is ranged from 2% to 20%.

In another embodiment, the weight percentage of the surfactant in the sealant composition is ranged from 0.1% to 2.5%.

In another embodiment, the weight percentage of the wetting agent in the sealant composition is ranged from the 0.01% to 5%.

In another embodiment, the sealant composition further comprises anti-freezing additive, and the anti-freezing additive includes inorganic salts and/or organic salts.

In another embodiment, the sealant composition further comprises assisted additive, and the assisted additive includes at least one of anti-corrosion additive, insecticide, pH-modifier, anti-foaming agent, preservative, colorant, and odorant.

The sealant composition of the present application achieves a good sealing performance for the puncture of the tire. Furthermore, the sealant composition is easy to use and non-perishable, and has a long shelf life, which endows the sealant composition with a good market prospect.

DETAILED DESCRIPTION OF THE PREFERRED EMBODIMENT

The present application discloses a sealant composition for repairing tires. The sealant composition comprises latex emulsion, and solid particles and fibers configured for achieving the sealing purpose. When the sealant composition flows through a tire puncture, a pressure difference between the interior of the tire and the external environment generates great shearing force, and the shearing force makes the latex emulsion form solid rubber. In this way, the tire puncture is sealed.

Specifically, in the present application, the sealant composition comprises the latex emulsion, nanoporous particles, surfactant, anti-freezing agent, wetting agent, and water. Furthermore, the sealant composition further comprises anti-freezing additive.

Furthermore, in the present application, the latex emulsion can be natural latex or synthetic latex. If the latex emulsion is natural latex, the natural latex including no impurity such as unwanted proteins, lipid, minerals, inorganic ions, and other contaminants is preferable, and should be capable of being obtained by means of purchase. The quality of the natural latex depends on the source of the latex material. The latex emulsion can also be synthetic latex such as NBR or SBR. In the present application, the weight percentage of the latex emulsion in the sealant composition is ranged from 2% to 20%, preferably from 6% to 11%.

Furthermore, in the present application, the nanoporous particles can be granular, fibrous, or in other shapes. The nanoporous particles have a low density because of the nanoporous structures, so the sedimentation odds of the sealant composition including the nanoporous particles are decreased. Moreover, a small amount (by weight) of the nanoporous particles can enhance the sealing performance for tire punctures of the sealant composition effectively because of its low density, so that the sealant composition including the nanoporous particles has a wider market prospect than normal sealant compositions.

Specially, in the present application, a small amount of nanoporous particles involved in the sealant composition may deposit or settle, but deposited or settled nanoporous particles can be easily dispersed again by slightly shaking the sealant composition. The nanoporous particles can include at least one of zeolite, silica aerogel, mesoporous silica, carbon aerogel, mesoporous carbon, activated carbon, cenosphere, diatomite, and porous metal and organic chelating compounds (e.g., metal organic frameworks). Furthermore, in the present application, the nanoporous particles with chitosan gel particles can also be added into the sealant composition, and the method for adding the chitosan gel particles into the sealant composition has been disclosed by the previous invention patent US 20120118199 A1.

In the present application, the pore size of the nanoporous particles is at least 0.5 nm, preferably larger than 2 nm, and the porosity of the nanoporous particles is ranged from 0.1 to 0.95. Moreover, the nanoporous particles can be granular, fibrous, or in other shapes, and the particle size of the nanoporous particles is less than 100 microns. Furthermore, when the specific surface area of the nanoporous particles is measured by the nitrogen absorption method, the specific surface area of the nanoporous particles should be more than 100 $m^2/g$. The weight percentage of the nanoporous particles in the sealant composition is ranged from 0.01% to 5%, and preferably from 0.1% to 1%.

Furthermore, in the present application, the sealant composition further comprises the water used as the medium configured for enabling the latex emulsion and the nanoporous particles to suspend. In the present application, the weight percentage of the water in the sealant composition is ranged from 0.01% to 42%.

In the present application, the sealant composition further comprises at least one kind of anti-freezing agent, such as glycol. The anti-freezing agent is used to widen an operational temperature range of the sealant composition. The anti-freezing agent can be at least one of propylene glycol, glycerin, diethylene glycol, and 1,3-propanediol, etc. In the present application, the weight percentage of the anti-freezing agent in the sealant composition is ranged from 40% to 90%. Besides, when the sealant composition includes two or more kinds of anti-freezing agent, there is no limitation to the ratio between different kinds of anti-freezing agent.

Furthermore, the sealant composition can further comprise the anti-freezing additive, and the weight percentage of the anti-freezing additive in the sealant composition is ranged from 0.01% to 10%. The anti-freezing additive includes inorganic salts and/or organic salts (e.g., potassium acetate) used to enhance the anti-freezing effect of the sealant composition. In the present application, the operational temperature range of the sealant composition is between −40° C. and 80° C.

Furthermore, the sealant composition further comprises at least one kind of surfactant. The surfactant is used to improve the stability of the latex emulsion so as to extend the shelf life of the sealant composition. The surfactant can be added into the sealant composition directly, and can also be mixed with the latex emulsion and then added into the sealant composition.

The surfactant can be anionic surfactant and/or non-ionic surfactant. The non-ionic surfactant can be at least one of polyoxyalkylene alkyl ether, polyoxyalkylene alkenyl ether, polyoxyethylene alkylamine, and triethanolamine laurate. The anionic surfactant can be SDS. Although SDS may increase the viscosity of the sealant composition, it can stabilize the latex emulsion in the sealant composition effectively.

The sealant composition can include composite surfactant fowled by mixing different kinds of surfactant together, wherein the kinds of the surfactant for forming the composite surfactant can be selected according to the kind and the amount of the latex emulsion used in the sealant composition. The composite surfactant can be a mixture of different kinds of nonionic surfactant, a mixture of at least one kind of nonionic surfactant and at least one kind of anionic surfactant, or a mixture of different kinds of anionic surfactant.

In the present application, the weight percentage of the surfactant in the sealant composition is ranged from 0.1% to 2.5%.

Furthermore, the sealant composition further comprises the wetting agent (e.g., alcohol, ether, or ester) used to improve the wettability, viscosity, and spreading property of the sealant composition. The wetting agent is used to decrease the surface tension of the sealant composition, so that the sealant composition can spread to an end surface area of a tire more easily. Thus, the sealant composition can effectively seal a puncture out of a tread area of a tire.

In the present application, the wetting agent can be ethanol, propanol, isopropanol, ethyl butyrate, dimethyl succinate, or other chemical materials, etc. These wetting agents have low surface tension, so that the surface tension of the sealant composition can be effectively reduced when these wetting agents are added into the sealant composition. In the present application, the weight percentage of the wetting agent in the sealant composition is ranged from the 0.01% to 5%. It is evident that the wetting agent decreases the contact angle of the sealant composition. Meanwhile, the wetting agent can enhance the anti-freezing effect and stabilizing effect of the sealant composition.

Additionally, the sealant composition can further comprise assisted additive. The assisted additive includes at least one of anti-corrosion additive, insecticide, pH-modifier, anti-foaming agent, preservative, colorant, and odorant.

The assisted additive is used to add corresponding functions of the sealant composition. For example, the preservative can be added into the sealant composition for preserving the bio-degradable components in the sealant composition, so that the shelf-life of the sealant composition can be extended to five years or more. The anti-corrosion additive can be added into the sealant composition to prevent the interior of a tire from rusting. The colorant can be used to dye the sealant composition, and the odorant can be used to eliminate pungent smell of the sealant composition. The colorant and the odorant do not cause any adverse effect on the sealing property of the sealant composition. The anti-foaming agent can be optionally added into the sealant composition to prevent the sealant composition from foaming. The pH-modifier is used for adjusting the pH of the sealant composition. When the pH of the sealant composition is more than 8, the latex emulsion in the sealant composition is more stable. The weight percentage of the assisted additive in the sealant composition is arranged from 0.01% to 1%.

The sealant composition of the present application can perform a significant sealing effect on a puncture of a tire caused by a spike with the length that is less than 8 mm. The sealant composition can keep the puncture of the tire being sealed for about 12-48 hours.

In the present application, the viscosity of the sealant composition is in the range of 18-800 mPas, and can change with the ambient temperature. The pH of the sealant composition is adjusted to be more than 8, preferably in the range of 8-11. When the pH of the sealant composition is between 8 and 11, the latex emulsion in the sealant composition is more stable. Furthermore, when the nanoporous particles are used to replace solid particles with a high density used in typical sealant compositions, the sealant composition does not generate evident settlement in at least 24 hours. When the surfactant and the preservative are added into the sealant composition, the sealant composition can maintain the proper function thereof for more than five years. In use, the sealant composition is injected into a tire through a hose under the action of compressed air, wherein, the injection pressure is preferably 2.5-10 bar, and the valve core of the tire can be either removed or not. In addition, the sealant composition can spread to reach the end surface area of the tire, so that a puncture out of the tread area of the tire can also be effectively sealed.

To test the sealant performance of the sealant composition on tires, a spike with a length that is less than 8 mm is used to form a puncture formed on a tire. The tire is mounted onto a vehicle, and the sealant composition is injected into the tire. The vehicle with the tire is then driven to run for less than 20 km. Every time when the vehicle runs for 2-5 km, the air leakage of the tire is checked by measuring the inner tire pressure. In this way, the sealing effect on the tire puncture, which is caused by the sealant composition, can be recorded by the aforementioned method. If the decrement of the inner tire pressure is less than 0.2 bar, it is indicated that the sealant composition seals the tire puncture successfully, that is, the sealing performance of the sealant composition is good. After the tire is detached from the vehicle, the tire is kept being stationary, with the tire puncture facing upwards. The pressure decrement can be measured again after 24 h or 48 h to confirm the sealing performance.

The shelf life of the sealant composition can be tested by static aging test and heat dynamic test. In the static aging test, the sealant composition is placed in an oven at a temperature of 70° C. or more for more than 40 days, and thus the sealing performance of the sealant composition can be tested as described above.

Twelve embodiments of the sealant composition are shown as follows.

Embodiment 1

The sealant composition comprises: 17.39 wt % water, 55 wt % glycerin, 20 wt % natural latex, 5 wt % ethanol, 1 wt % non-ionic surfactant, 1.5 wt % anionic surfactant, 0.01 wt % silica aerogel, and 0.1 wt % assisted additive.

Embodiment 2

The sealant composition comprises: 32.01 wt % water, 40 wt % glycerin, 5 wt % potassium acetate, 5 wt % Inorganic salt, 10 wt % natural latex, 2.5 wt % ethanol, 1 wt % non-ionic surfactant, 0.5 wt % anionic surfactant, 1 wt % mesoporous silica, 0.5 wt % silica aerogel, 1.99 wt % activated carbon, and 0.5 wt % assisted additive.

Embodiment 3

The sealant composition comprises: 33.15 wt % water, 50 wt % glycerin, 14 wt % synthetic latex, 2.2 wt % ethanol, 0.35 wt % non-ionic surfactant, 0.2 wt % cenosphere, and 0.1 wt % assisted additive.

Embodiment 4

The sealant composition comprises: 38.3 wt % water, 48 wt % glycerin, 10 wt % synthetic latex, 2.5 wt % ethanol, 0.7 wt % non-ionic surfactant, 0.2 wt % anionic surfactant, 0.2 wt % silica aerogel, and 0.1 wt % assisted additive.

Embodiment 5

The sealant composition comprises: 38.2 wt % water, 48 wt % 1,3-propanediol, 10 wt % synthetic latex, 2.5 wt % ethanol, 0.7 wt % non-ionic surfactant, 0.3 wt % anionic surfactant, 0.2 wt % mesoporous carbon, and 0.1 wt % assisted additive.

Embodiment 6

The sealant composition comprises: 38.35 wt % water, 48 wt % propylene glycol, 10 wt % synthetic latex, 2.5 wt % isopropanol, 0.7 wt % non-ionic surfactant, 0.3 wt % anionic surfactant, 0.05 wt % silica aerogel, and 0.1 wt % assisted additive.

Embodiment 7

The sealant composition comprises: 14.7 wt % water, 70 wt % glycerin, 5 wt % inorganic salt, 5 wt % natural latex, 2 wt % non-ionic surfactant, 2 wt % silica aerogel, 1 wt % zeolite, and 0.3 wt % assisted additive.

Embodiment 8

The sealant composition comprises: 2.8 wt % water, 90 wt % propylene glycol, 2 wt % synthetic latex, 0.1 wt % anionic surfactant, 2 wt % silica aerogel, 3 wt % carbon aerogel, and 0.1 wt % assisted additive.

Embodiment 9

The sealant composition comprises: 40.3 wt % water, 45 wt % propylene glycol, 2 wt % potassium acetate, 8 wt % synthetic latex, 2.5 wt % isopropanol, 1 wt % non-ionic surfactant, 0.6 wt % anionic surfactant, 0.2 wt % mesoporous silica, 0.1 wt % silica aerogel, 0.1 wt % carbon aerogel, 0.1 wt % cenosphere, and 0.1 wt % assisted additive.

Embodiment 10

The sealant composition comprises 34.3 wt % water, 48 wt % propylene glycol, 2 wt % potassium acetate, 10 wt % synthetic latex, 1 wt % isopropanol, 2 wt % n-propanol, 0.7 wt % non-ionic surfactant, 0.5 wt % anionic surfactant, 0.2 wt % mesoporous silica, 0.2 wt % activated carbon, 0.1 wt % cenosphere, and 1 wt % assisted additive.

Embodiment 11

The sealant composition comprises: 28.6 wt % water, 54 wt % glycerin, 10 wt % synthetic latex, 5 wt % ether, 1 wt % non-ionic surfactant, 0.1 wt % anionic surfactant, 0.2 wt % activated carbon, 0.1 wt % cenosphere, and 1 wt % assisted additive.

Embodiment 12

The sealant composition comprises: 28.6 wt % water, 54 wt % glycerin, 10 wt % synthetic latex, 5 wt % ester, 1 wt % non-ionic surfactant, 0.1 wt % anionic surfactant, 0.2 wt % activated carbon, 0.1 wt % cenosphere, and 1 wt % assisted additive.

Table 1 shows test results of the above-mentioned twelve embodiments of the present application as follows.

TABLE 1

| Embodiment number | Viscosity (mPas) at −30° C. | Viscosity (mPas) at 25° C. | pH | Solid content (%) | Sealing performance | Aging tests | Cream formation (wt %) |
|---|---|---|---|---|---|---|---|
| 1 | 239 | 35 | 11 | 12.3 | Good | Pass | <10 |
| 2 | 310 | 28 | 11.5 | 10 | Good | Pass | <10 |
| 3 | 165 | 32 | 10.5 | 9.3 | Good | Pass | <10 |
| 4 | 160 | 36 | 10.5 | 7.2 | Good | Pass | <10 |
| 5 | 130 | 18 | 10.8 | 7.3 | Good | Pass | <10 |
| 6 | 202 | 25 | 11 | 7.1 | Good | Pass | <10 |
| 7 | 720 | 25 | 10.9 | 8 | Good | Pass | <10 |
| 8 | 800 | 48 | 9 | 6.3 | Fair | Pass | <10 |
| 9 | 220 | 26 | 8 | 6.6 | Good | Pass | <10 |
| 10 | 220 | 20 | 9.5 | 7.7 | Good | Pass | <10 |
| 11 | 250 | 20 | 10 | 7.4 | Good | Pass | <10 |
| 12 | 261 | 26 | 10 | 7.4 | Good | Pass | <10 |

In the present application, the viscosity of the sealant composition is ranged from 18 mPas to 800 mPas; and the pH of the sealant composition is ranged from 8 to 11. The operational temperature of the sealant composition is ranged from −40° C. to 80° C. The sealant composition can seal the puncture of the tire for more than 24 hours. After the sealant composition is used to seal the tire puncture, it can be cleaned easily by water flushing.

Above all, the sealant composition of the present application achieves a good sealing performance for the puncture of the tire. Furthermore, the sealant composition is easy to use and non-perishable, and has a long shelf life, which endows the sealant composition with a good market prospect.

While the embodiments of the present application are described with reference to the accompanying drawings above, the present application is not limited to the above-mentioned specific implementations. In fact, the above-mentioned specific implementations are intended to be exemplary not to be limiting. In the inspiration of the present application, those ordinary skills in the art can also make many modifications without breaking away from the subject of the present application and the protection scope of the claims. All these modifications belong to the protection of the present application.

What is claimed is:

1. A sealant composition, comprising: an adhesive agent consisting of latex emulsion, at least one nanoporous particle consisting essentially of zeolite, carbon aerogel, mesoporous carbon, activated carbon, cenosphere, porous metal, and organic chelating compounds, surfactant, anti-freezing agent, wetting agent, pH-modifier, and water, wherein the anti-freezing agent has a weight percentage in the sealant composition ranging from 40% to 90%, wherein, the weight percentage of the nanoporous particles in the sealant composition is less than 5% and above 0.01%.

2. The sealant composition according to claim 1, wherein the organic chelating compounds comprise metal organic frameworks.

3. The sealant composition according to claim 1, wherein, the anti-freezing agent includes at least one of propylene glycol, glycerin, diethylene glycol, and 1,3-propanediol.

4. The sealant composition according to claim 1, wherein, the weight percentage of the surfactant in the sealant composition ranges from 0.1% to 2.5%.

5. The sealant composition according to claim 1, wherein, the weight percentage of the wetting agent in the sealant composition ranges from 0.01% to 5%.

6. The sealant composition according to claim 1, wherein, the sealant composition further comprises anti-freezing additive, and the anti-freezing additive includes at least one of inorganic salts and organic salts.

7. The sealant composition according to claim 1, wherein, the sealant composition further comprises assisted additive, and the assisted additive includes at least one of anti-corrosion additive, insecticide, anti-foaming agent, preservative, colorant, and odorant.

8. The sealant composition according to claim 1, wherein viscosity of the sealant composition ranges from 18 to 800 mPas.

9. The sealant composition according to claim 1, wherein pH of the sealant composition ranges from 8 to 11.

* * * * *